May 7, 1935. P. CORIGLIANO 2,000,510
DRY CELL
Filed March 2, 1932 2 Sheets-Sheet 1
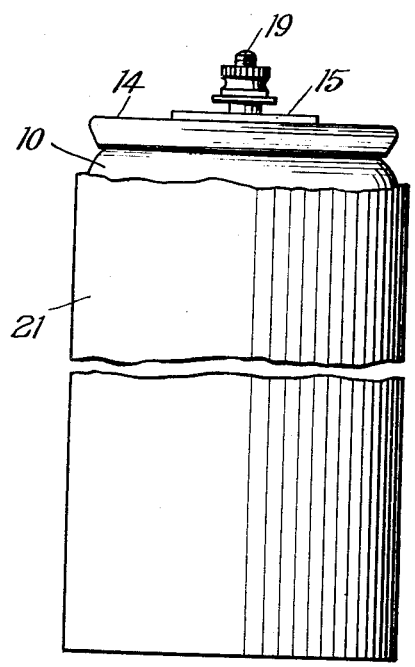
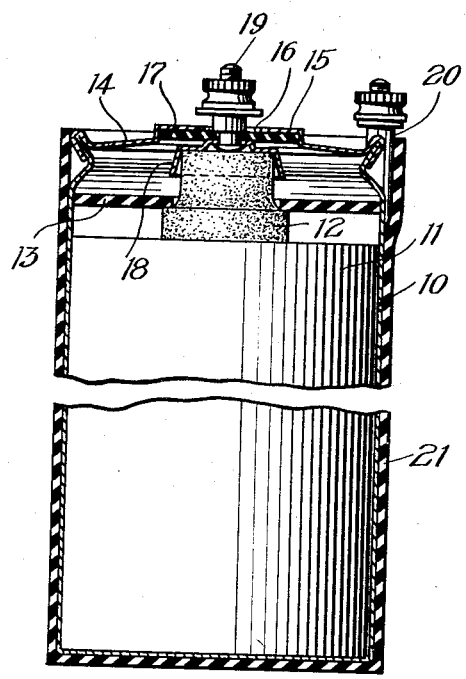
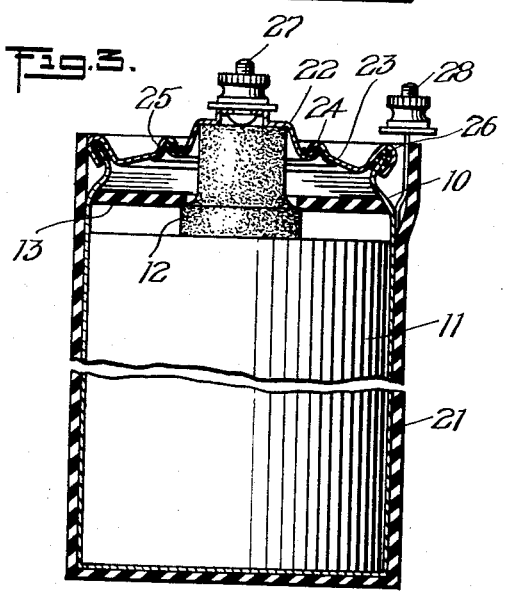
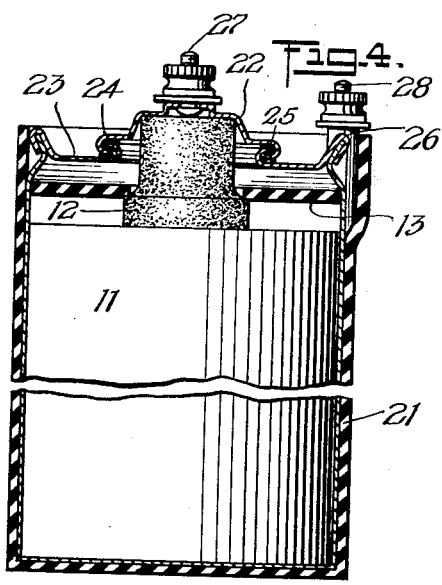
INVENTOR
Peter Corigliano
Kenyon & Kenyon
BY
ATTORNEYS May 7, 1935. P. CORIGLIANO 2,000,510
DRY CELL
Filed March 2, 1932   2 Sheets-Sheet 2
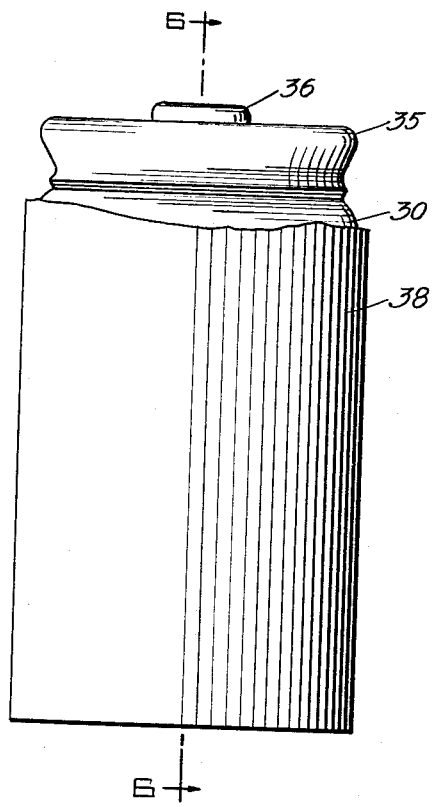
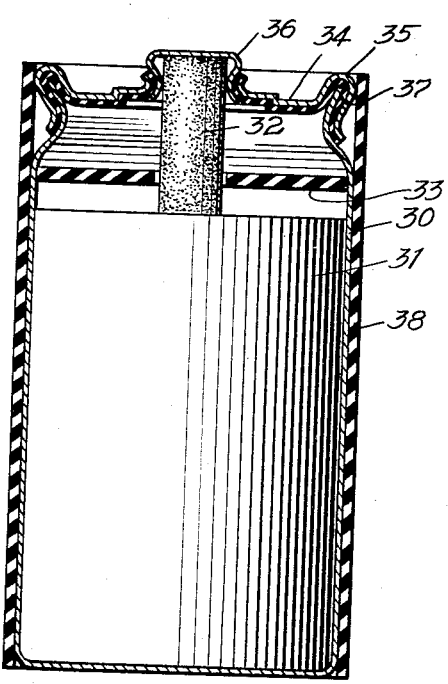
INVENTOR
Peter Corigliano
Kenyon & Kenyon
ATTORNEYS Patented May 7, 1935

2,000,510

UNITED STATES PATENT OFFICE 2,000,510

DRY CELL

Peter Corigliano, St. Albans, N. Y., assignor to Bright Star Battery Company, Hoboken, N. J., a corporation of New York Application March 2, 1932, Serial No. 596,223

5 Claims. (Cl. 136—133)

This invention relates to dry cells and has for an object an inexpensive and an efficient dry cell having an improved seal for eliminating the use of sealing compounds previously used.

A dry cell embodying this invention comprises the usual metal cup within which is contained a cartridge having the usual central electrode. The closure for the cup comprises a two-part rigid cover attached at its periphery to the metal cup. The outer portion of the cover is of metal and the inner portion may be either of metal or insulating material. The inner portion if, of metal, either may constitute one terminal of the battery or may have a binding post supported thereby. The inner portion, if of insulating material, supports a binding post. In any event, the central portion of the cover or binding post carried thereby is in electrical contact with the central electrode. In an all metal cover, the inner portion is insulated from the outer portion or the outer portion is insulated from the cup so that short-circuiting is prevented. This closure arrangement eliminates the use of the sealing compounds previously used and which are subject to many defects. It permits the use of a larger cartridge in the same size container, thereby resulting in an increased battery life. It also provides a tight seal regardless of temperature conditions and renders the battery less expensive to manufacture than batteries using sealing compound.

Other objects, novel features and advantages of this invention will be apparent from the following specification and accompanying drawings, wherein:

Fig. 1 is an elevation of a dry cell embodying the invention;

Fig. 2 is a vertical section of such cell;

Figs. 3 and 4 are vertical sections through modified forms of cells;

Fig. 5 is an elevation of a modified form of cell, and

Fig. 6 is a section on the line 6—6 of Fig. 5;

Referring now more especially to Figs. 1 and 2, the battery consists of a metal cup 10 in which is contained a cartridge 11, centrally of which is provided a carbon electrode 12. A paper washer 13 is arranged within the cup and has an aperture through which the carbon electrode extends, this washer serving to center the carbon electrode during assembly and also to form a gas chamber. A metal cover 14 is permanently attached at its periphery to the rim of the cup by crimping the edge of the cover over the rim of the cup. The cover is formed with a central offset 15 in which is provided a central aperture 16. A fibre disk 17 or a preformed disk of other suitable insulating material is mounted in the offset 15, the metal of the cover preferably being rolled under the disk to lock it permanently in the offset. A metal cap 18 is riveted to the fibre disk 17 by a stud 19 which extends through the aperture 16 and constitutes one of the binding posts of the battery. The cap 18 fits over the upper end of the carbon electrode and makes electrical contact therewith.

A second binding post 20 is attached to the cup 10 in the usual manner. A paper jacket 21 of the usual type surrounds the cup 10. The two binding posts are insulated from each other by reason of the insulating qualities of the fibre disk 17.

In the modification disclosed in Fig. 3, the cover is formed of two sections 22 and 23 which are crimped together permanently at 24 with an annulus of insulating material 25 maintaining them out of electrical contact. The metal cover rests on the central electrode 12 and is permanently joined at its periphery to the rim of the cup 10, the cover and cup being maintained out of electrical contact by interposed insulating material 26. A binding post 27 is riveted to the central portion of the cover and a second binding post 28 is attached to the cup 10. In this type of cell, the section 23 of the cover is of neutral polarity as it is insulated from both poles of the cell.

In the modification disclosed in Fig. 4, the cover is composed of two sections 22 and 23 which are crimped together at 24 with an annulus of insulating material 25 interposed to maintain the two sections out of electrical contact. The cover is permanently attached at its outer periphery to the cup in electrical contact therewith. Binding posts 27 and 28 are provided, the binding post 27 being connected to the section 22 of the cover, while the binding post 28 is connected to the cup 10.

Referring now to Figs. 5 and 6, a metal cup 30 contains a cartridge 31 provided with a centrally arranged carbon electrode 32, the upper end of which projects slightly above the rim of the cup and has a paper washer 33 associated therewith. The cup is closed by a two-part metal cover 34 having near its periphery an annular pocket 35 in which is received the upper end of the cup 30. The cover 34 is formed in two parts, the central part 36 of which constitutes a cap to receive the upper end of the carbon electrode 32. The central portion 36 is provided with a groove in which is rolled the curved inner edge of the remaining portion of the cover. A disk 37 of insulating material has its inner edge arranged between the two parts of the cover and is tightly clamped therebetween. The disk underlies the cover 34 and is fitted into the pocket 35, thus being interposed between the cup 30 and the cover 34. The central portion of the cover is insulated from the remaining portion which in turn is insulated from the cup 30. The major portion of the cover is thus neutral and serves to prevent accidental short-circuiting of the cell. The usual paper shell 38 surrounds the cup 30.

The cells above described are provided with tight seals which will withstand varying temperature conditions and also rough usage, thereby preventing drying out of the cell. In each instance, sealing wax is completely dispensed with and the cell is provided with a strong metal closure.

It is of course understood that various modifications may be made in the structure above described, without in any way departing from the spirit of the invention as defined in the appended claims.

I claim:

1. A dry cell comprising a metal cup containing a cartridge having a centrally arranged electrode, a metal cover comprising a central continuous metal portion recessed to receive and enclose the upper end of said electrode, and an outer continuous metal portion having rigid, permanent connection at its outer edge with the rim of said cup, the outer edge of the central portion and the inner edge of the outer portion being crimped together and forming a permanent mechanical connection between said portions, and insulation interposed between said central and outer portions.

2. A dry cell comprising a metal cup containing a cartridge having a centrally arranged electrode, a metal cover comprising a central continuous metal portion recessed to receive and enclose the upper end of said electrode and an outer continuous metal portion having rigid, permanent connection at its outer edge with the rim of said cup, the outer edge of the central portion and the inner edge of the outer portion being crimped together and forming a permanent mechanical connection between said portions, and insulation interposed between said central and outer portions and between said outer portion and said cup.

3. A dry cell comprising a metal cup containing a cartridge having a centrally arranged electrode, a cover closing said cup with the central electrode completely enclosed, said cover constituting the sole sealing means for said cover and being composed of a central metal portion and an outer metal portion having a permanent rigid connection at its outer edge with the rim of the cup, the outer edge of the central portion and the inner edge of the outer portion being crimped together and forming a permanent mechanical connection between said portions, said central portion being electrically insulated from said cup and being electrically connected with said electrode.

4. A dry cell comprising a metal cup containing a cartridge having a centrally arranged electrode, a cover closing said cup with the electrode completely enclosed, said cover being composed of a central metal portion and a metal outer portion, the outer edge of the central portion and the inner edge of the outer portion being crimped together and said outer portion having rigid connection at its outer edge with the rim of said cup, and insulation between said central and outer portions, said central portion being electrically connected with said electrode.

5. A dry cell comprising a metal cup containing a cartridge having a centrally arranged electrode, a cover closing said cup with the electrode completely enclosed, said cover being composed of a central metal portion and a metal outer portion, the outer edge of the central portion and the inner edge of the outer portion being crimped together and said outer portion having rigid connection at its outer edge with the rim of said cup, and insulation interposed between said central and outer portions and between said outer portion and cup, said central portion being electrically connected with said electrode.

PETER CORIGLIANO.